(12) United States Patent
Kish et al.

(10) Patent No.: US 10,988,053 B2
(45) Date of Patent: Apr. 27, 2021

(54) SWIVEL ASSEMBLY FOR A VEHICLE SEATING ASSEMBLY

(71) Applicant: Ford Global Technologies, LLC, Dearborn, MI (US)

(72) Inventors: Joseph Michael Kish, Canton, MI (US); Macit Aktas, Windsor (CA)

(73) Assignee: Ford Global Technologies, LLC, Dearborn, MI (US)

(*) Notice: Subject to any disclaimer, the term of this patent is extended or adjusted under 35 U.S.C. 154(b) by 169 days.

(21) Appl. No.: 16/406,396

(22) Filed: May 8, 2019

(65) Prior Publication Data

US 2020/0353846 A1 Nov. 12, 2020

(51) Int. Cl.
*B60N 2/14* (2006.01)
*B60N 2/68* (2006.01)
*B60N 2/02* (2006.01)

(52) U.S. Cl.
CPC ............. *B60N 2/14* (2013.01); *B60N 2/0232* (2013.01); *B60N 2/682* (2013.01)

(58) Field of Classification Search
CPC ......... B60N 2/14; B60N 2/0232; B60N 2/682
See application file for complete search history.

(56) References Cited

U.S. PATENT DOCUMENTS

| | | | |
|---|---|---|---|
| 1,902,282 A | 3/1933 | Hultgren | |
| 3,207,464 A | 9/1965 | Hrach | |
| 3,243,236 A | 3/1966 | Graham | |
| 4,098,485 A | 7/1978 | Mizelle | |
| 4,600,239 A | 7/1986 | Gerstein et al. | |
| 4,846,529 A | 7/1989 | Tulley | |
| 4,969,685 A | 11/1990 | Chihaya et al. | |
| 6,220,965 B1 | 4/2001 | Hanna et al. | |
| 2001/0038223 A1 | 11/2001 | Suga et al. | |
| 2007/0164592 A1* | 7/2007 | Gerhardt | B60N 2/14 297/344.23 |
| 2014/0167471 A1* | 6/2014 | Haller | B60N 2/14 297/344.22 |

* cited by examiner

*Primary Examiner* — Anthony D Barfield
(74) *Attorney, Agent, or Firm* — David Coppiellie; Price Heneveld LLP (57) ABSTRACT

A swivel assembly for a vehicle seating assembly includes a fixed plate defining a first opening. A rotating plate defines a second opening. The rotating plate is positioned substantially parallel to the fixed plate. A gear ring is positioned about a periphery of the first opening. An inner retaining bracket is received by the first and second openings and is coupled with the gear ring. An outer retaining bracket is coupled with the rotating plate and defines a channel. The fixed plate is at least partially received by the channel. A washer is positioned between the fixed plate and the rotating plate. A bearing member includes first and second legs. The first leg is positioned between the rotating plate and the fixed plate. The second leg is positioned between the fixed plate and the inner retaining bracket.

18 Claims, 9 Drawing Sheets

SWIVEL ASSEMBLY FOR A VEHICLE SEATING ASSEMBLY

FIELD OF THE DISCLOSURE

The present disclosure generally relates to a swivel assembly and, more particularly, to a power-driven swivel assembly for a vehicle seating assembly.

BACKGROUND OF THE DISCLOSURE

Currently, seating assemblies include a seatback and a seat base mounted within a vehicle interior. With the introduction of autonomous vehicles and reconfigurable interiors, occupants are interested in the development of new seating designs that allow passengers to orient the seating assembly facing forward, rearward, and at different angles and new seating designs that allow passengers to easily maneuver the seating assemblies to provide ingress/egress and storage.

SUMMARY OF THE DISCLOSURE

According to one aspect of the present disclosure, a swivel assembly for a vehicle seating assembly includes a fixed plate defining a first opening. A rotating plate defines a second opening. The rotating plate is positioned substantially parallel to the fixed plate. A gear ring is positioned about a periphery of the first opening. An inner retaining bracket is received by the first and second openings and is coupled with the gear ring. An outer retaining bracket is coupled with the rotating plate and defines a channel. The fixed plate is at least partially received by the channel. A washer is positioned between the fixed plate and the rotating plate. A bearing member includes first and second legs. The first leg is positioned between the rotating plate and the fixed plate. The second leg is positioned between the fixed plate and the inner retaining bracket.

Embodiments of this aspect of the disclosure can include any one or a combination of the following features:
- the swivel assembly further including a power actuator coupled with the fixed plate and including a pinion, wherein the pinion is operably coupled with the gear ring, and further wherein rotating of the pinion is configured to drive rotation of the gear ring;
- the fixed plate including a first outer rim and the rotating plate includes a second outer rim, wherein the second outer rim is at least partially exterior to the first outer rim;
- the first outer rim being at least partially received by the channel of the outer retaining bracket;
- each of the fixed plate and the rotating plate including at least one linear side and at least one arcuate side; and/or
- the fixed plate is at least partially encompassed by the rotating plate.

According to another aspect of the present disclosure, a swivel assembly for a vehicle seating assembly includes a fixed plate with a raised central portion defining a first opening. A rotating plate includes a recessed central portion defining a second opening. The raised central portion and the recessed central portion are positioned substantially parallel. A gear ring is positioned about a periphery of the first opening. An inner retaining bracket is received by the first opening and the second opening. The inner retaining bracket is coupled with the gear ring. A washer is positioned between the raised central portion and the recessed central portion. A bearing member is at least partially positioned between the rotating plate and the fixed plate and forming a sliding interface therebetween.

Embodiments of this aspect of the disclosure can include any one or a combination of the following features:
- the swivel assembly further including an outer retaining bracket coupled with the rotating plate, wherein the outer retaining bracket includes an elongated portion and a retaining portion, the retaining portion defining a channel, and further wherein an outer edge of the fixed plate is at least partially received by the channel;
- the bearing member including a first leg positioned between the raised central portion and the recessed central portion and forming a sliding interface therebetween, and a second leg positioned between an inner edge of the inner retaining bracket and the fixed plate and forming a sliding interface therebetween;
- the bearing member including a protrusion extending from an end of the second leg opposite the first leg, wherein the protrusion is positioned between the gear ring and the inner edge of the fixed plate and forming a sliding interface therebetween;
- the washer being a spring washer and being configured to space apart the fixed plate and the rotating plate to define a gap; and/or
- the inner retaining bracket being coupled with an upper surface of the recessed central portion of the rotating plate.

According to another aspect of the present disclosure, a swivel assembly for a vehicle seating assembly includes a fixed plate defining a first opening. A rotating plate is rotatable relative to the fixed plate and defines a second opening. The first opening is aligned with the second opening. A gear ring is positioned about a periphery of the first opening. An inner retaining bracket is received by the first opening and the second opening. The inner retaining bracket is coupled with the gear ring. A bearing member is at least partially positioned between the rotating plate and the fixed plate.

Embodiments of this aspect of the disclosure can include any one or a combination of the following features:
- the swivel assembly further including an outer retaining bracket including an elongated portion and a retaining portion, the elongated portion fixedly coupled with the rotating plate, wherein the outer retaining bracket rotates in conjunction with the rotating plate;
- the inner retaining bracket including an upper portion integrally formed with a lower portion, wherein the upper portion is coupled with the rotating plate and the lower portion is coupled with the gear ring, and further wherein the inner retaining bracket and the rotating plate are configured to rotate in conjunction with the gear ring;
- the swivel assembly further including a power actuator coupled with the fixed plate and including a pinion, wherein the pinion is operably coupled with the gear ring, and further wherein rotation of the pinion is configured to drive rotation of the gear ring;
- the swivel assembly further including a controller electrically coupled with the power actuator, wherein the controller is configured to provide instructions to the power actuator for rotation of the pinion;
- an outer edge of the fixed plate being spaced apart from the outer retaining bracket when the rotating plate and the fixed plate are in a neutral position;
- the swivel assembly further including a spring washer positioned within a gap defined by the fixed plate and the rotating plate, wherein the spring washer is configured to maintain the gap between the fixed plate and the rotating plate and to bias the rotating plate and the fixed plate in a neutral position; and/or the bearing member including a first leg positioned between the fixed plate and the rotating plate and forming a sliding interface therebetween, a second leg positioned between an inner edge of the inner retaining bracket and the fixed plate and forming a sliding interface therebetween, and a protrusion extending from an end of the second leg opposite the first leg, wherein the protrusion is positioned between the gear ring and the inner edge of the fixed plate and forming a sliding interface therebetween.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

The present illustrated embodiments reside primarily in combinations of method steps and apparatus components related to a swivel assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
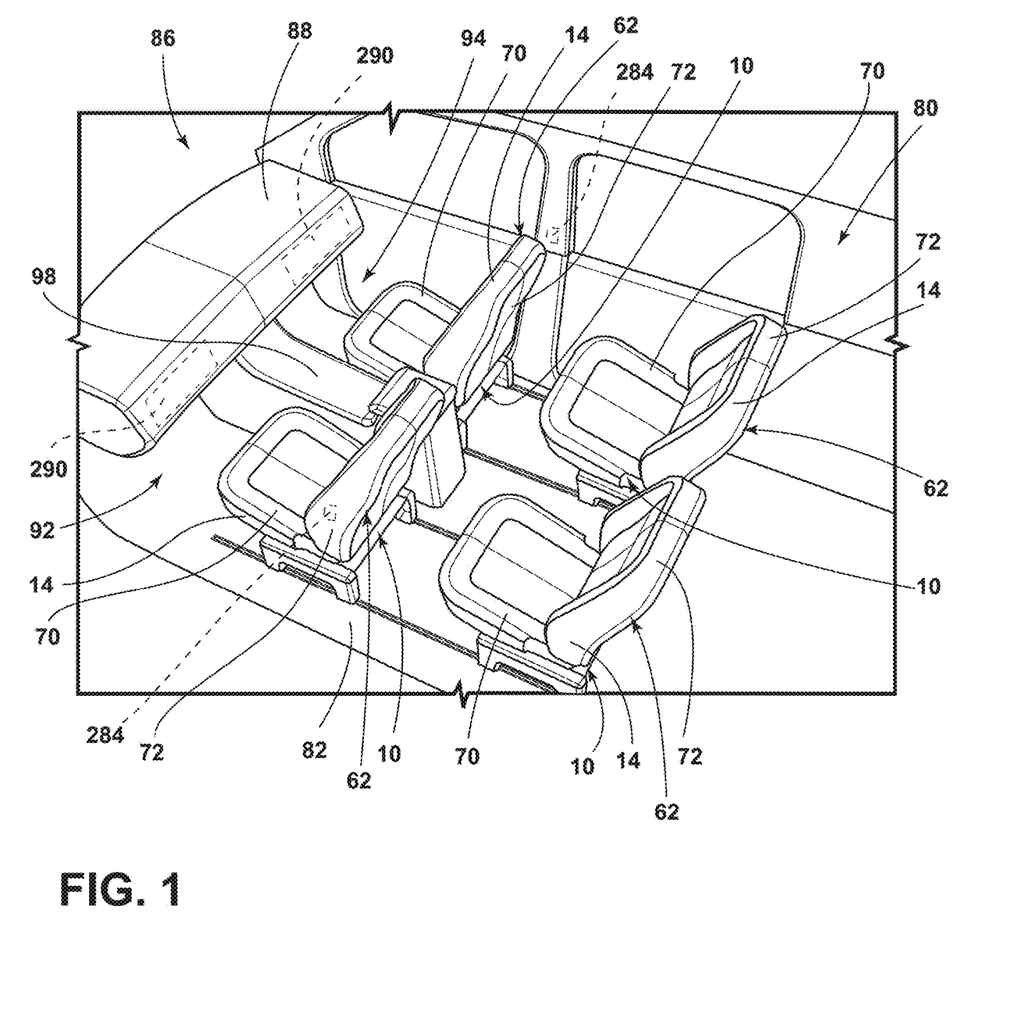
FIG. 1 is a top perspective view of a vehicle interior having a seating system disposed therein with all of a plurality of seating assemblies in a first position, according to some examples.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-8, reference numeral 10 generally designates a swivel assembly for a vehicle seating assembly 14. The swivel assembly 10 includes a fixed plate 18 defining a first opening 22. A rotating plate 26 defines a second opening 30. The fixed plate 18 and the rotating plate 26 are substantially parallel. A gear ring 34 is positioned about a periphery of the first opening 22. An inner retaining bracket 38 is received by the first and second openings 22, 30. The inner retaining bracket 38 is coupled with the gear ring 34. An outer retaining bracket 42 is coupled with the rotating plate 26. The outer retaining bracket 42 defines a channel 46. The fixed plate 18 is at least partially received by the channel 46. A washer 50 is positioned between the fixed plate 18 and the rotating plate 26. A bearing member 54 includes first and second legs 58, 60. The first leg 58 is positioned between the fixed plate 18 and the rotating plate 26. The second leg 60 is positioned between the fixed plate 18 and the inner retaining bracket 38.

Figure 2:
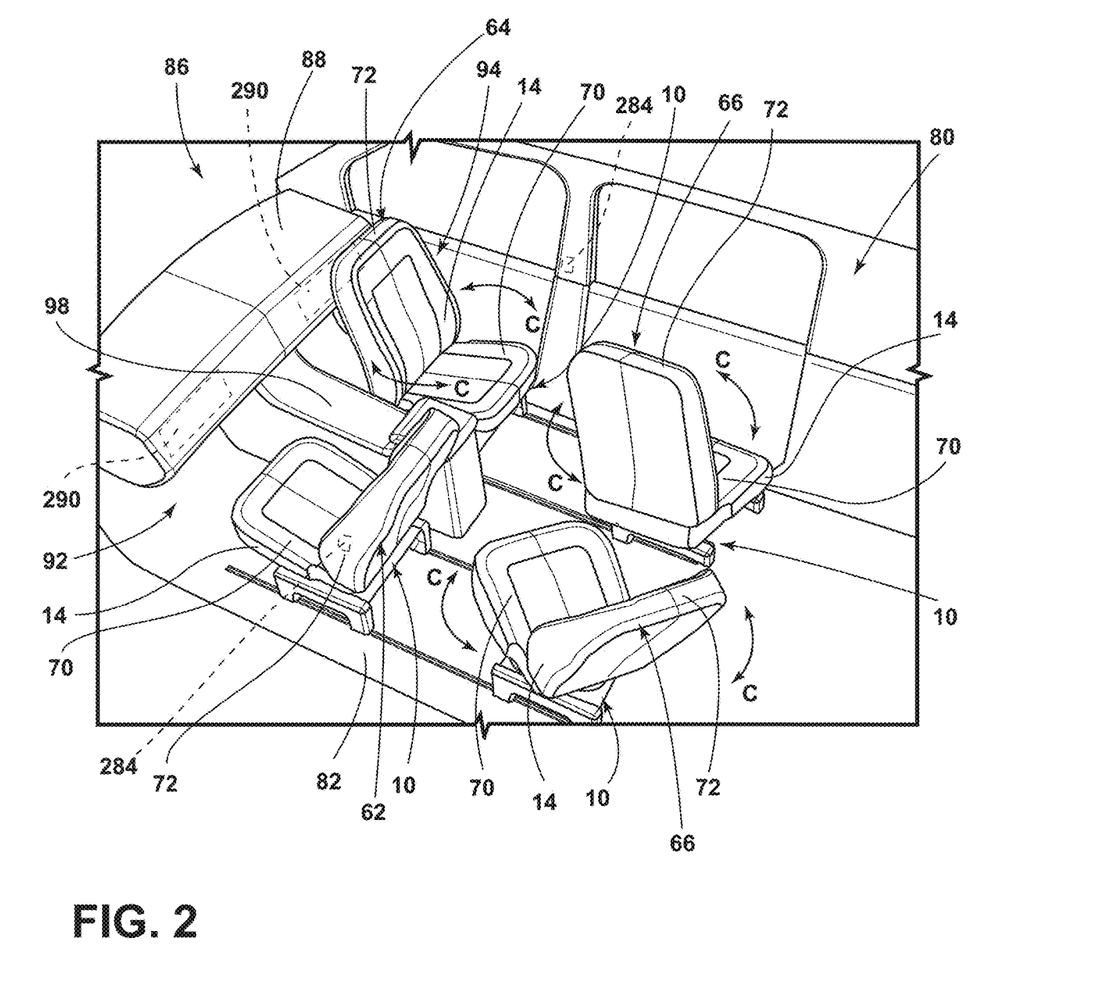
FIG. 2 is a top perspective view of the seating system of FIG. 1 with each of the plurality of seating assemblies in one of the first position, a second position, and an intermediate position, according to some examples.

Referring to FIGS. 1 and 2, a seating system 80 is illustrated disposed within an interior of a vehicle 86. In various examples, the seating system 80 may be operably coupled with a floor 82 of the vehicle 86. The seating system 80 may include one or more vehicle seating assemblies 14. A console 88 may extend from a first side portion 92 of the vehicle interior to a second side portion 94 of the vehicle interior. A center stack portion 98 may extend in a vehicle rearward direction from the console 88 and may partially separate the first side portion 92 and the second side portion 94 of the interior of the vehicle 86. In the illustrated example, the seating system 80 is positioned within an autonomous vehicle, specifically a sports utility vehicle (SUV). However, it will be understood that the illustration is exemplary only and the seating system 80 may be utilized in any type of vehicle 86, such as, for example, a car, truck, van, etc. Additionally, it will be understood that the vehicle 86 may be autonomous or configured for a driver without departing from the scope of the present disclosure.

Figure 3:
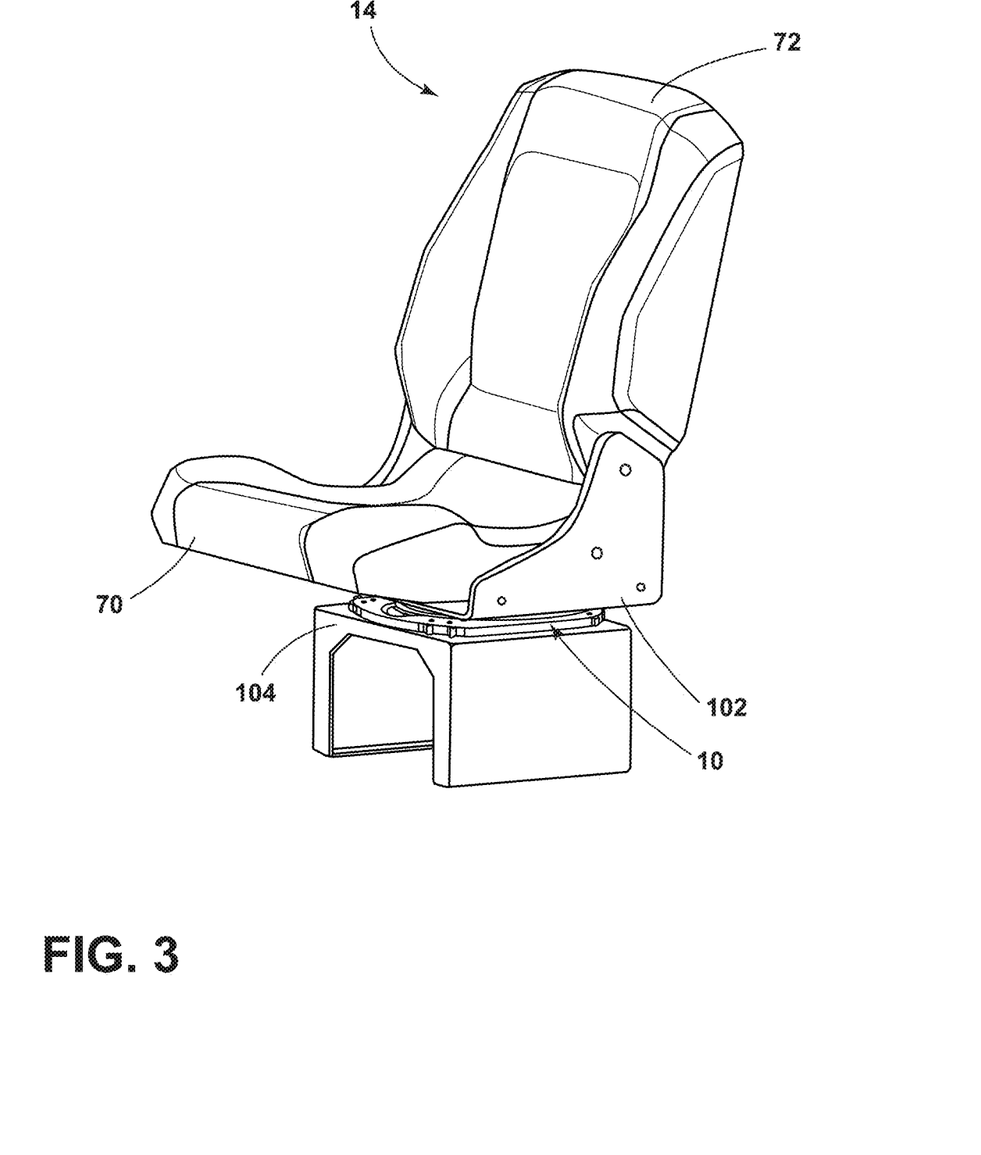
FIG. 3 is a side perspective view of one of the plurality of seating assemblies of the seating system of FIG. 1 having a swivel assembly, according to some examples.

Referring now to FIGS. 1-3, the one or more of the seating assemblies 14 of the seating system 80 may include the swivel assembly 10 operably coupled with a seat base 70. Each seating assembly 14 may include the seat base 70 operably coupled with a seatback 72. In some examples, a cradle 102 may be operably coupled with the seat base 70 and the seatback 72. A base 104 may be positioned to support the seating assembly 14. The swivel assembly 10 may be positioned between the cradle 102 and the base 104. Alternatively, the swivel assembly 10 may be positioned between the seat base 70 and the base 104, between the seat base 70 and the floor 82 of the vehicle 86, between the cradle 102 and the floor 82 of the vehicle 86, or in any other configuration that allows the swivel assembly 10 to selectively rotate the seating assembly 14.

Referring again to FIGS. 1 and 2, the swivel assembly 10 of the seating assembly 14 is rotatable along a path illustrated by arrows C. According to various examples, the seating assembly 14 may be positioned in a forward-facing position 62, a rear-facing position 64, or an intermediate position 66. When the seating assembly 14 is in the intermediate position 66, the swivel assembly 10 is positioned at any angle between the forward-facing position 62 and the rear-facing position 64. The rear-facing position 64 may be a full 180 degree turn from the forward-facing position 62. In other examples, the swivel assembly 10 of the seating assembly 14 may have predetermined angles of rotation selectively engageable by a user. For example, the swivel assembly 10 may be rotatable into a conversation position that orients the seating assembly 14 at an angle relative to other seating assemblies 14. The conversation position may be a position rotated between about 15 degrees to about 20 degrees from the forward-facing position 62 or the rear-facing position 64. The swivel assembly 10 may further be rotatable into a side-facing position toward or away from a door of the vehicle 86 to allow easy entry and/or access to the vehicle 86 and/or the vehicle interior. It will be understood that the seating assembly 14 may be rotatable on the swivel assembly 10 in a clockwise or counter-clockwise direction without departing from the scope of the present disclosure.

Referring now to FIGS. 4-8, the swivel assembly 10 is illustrated fully assembled with the rotating plate 26 rotatable relative to the fixed plate 18. The inner and outer retaining brackets 38, 42 may operably couple the rotating plate 26 with the fixed plate 18. The gear ring 34 may be coupled with the inner retaining bracket 38 and may be configured to facilitate rotation of the rotating plate 26, as discussed in more detail elsewhere herein.

With reference again to FIGS. 4-6, the fixed plate 18 may include a body 110 having first and second linear sides 126, 128 and first and second arcuate sides 130, 132. The body 110 may be generally oblong in shape, where the first and second linear sides 126, 128 are elongated, or the body 110 may be generally square. The first and second linear sides 126, 128 may be substantially parallel and may be joined by the first and second arcuate sides 130, 132. The first and second arcuate sides 130, 132 may be substantially convex and extend away from the first and second linear sides 126, 128. The first arcuate side 130 may mirror the second arcuate side 132 such that a radius of curvature for both the first arcuate side 130 and the second arcuate side 132 is substantially the same.

Figure 4:
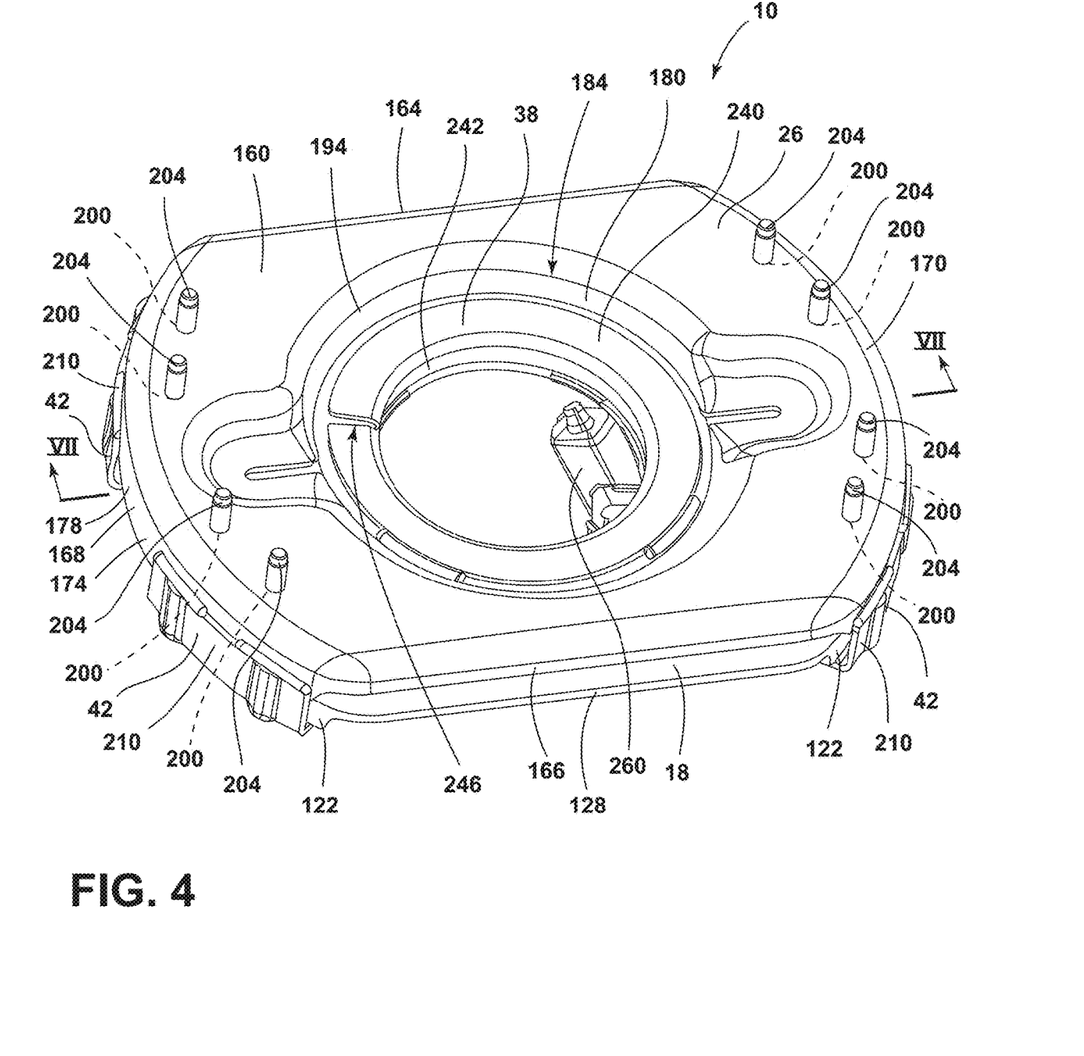
FIG. 4 is a top perspective view of a swivel assembly, according to some examples.
Figure 5:
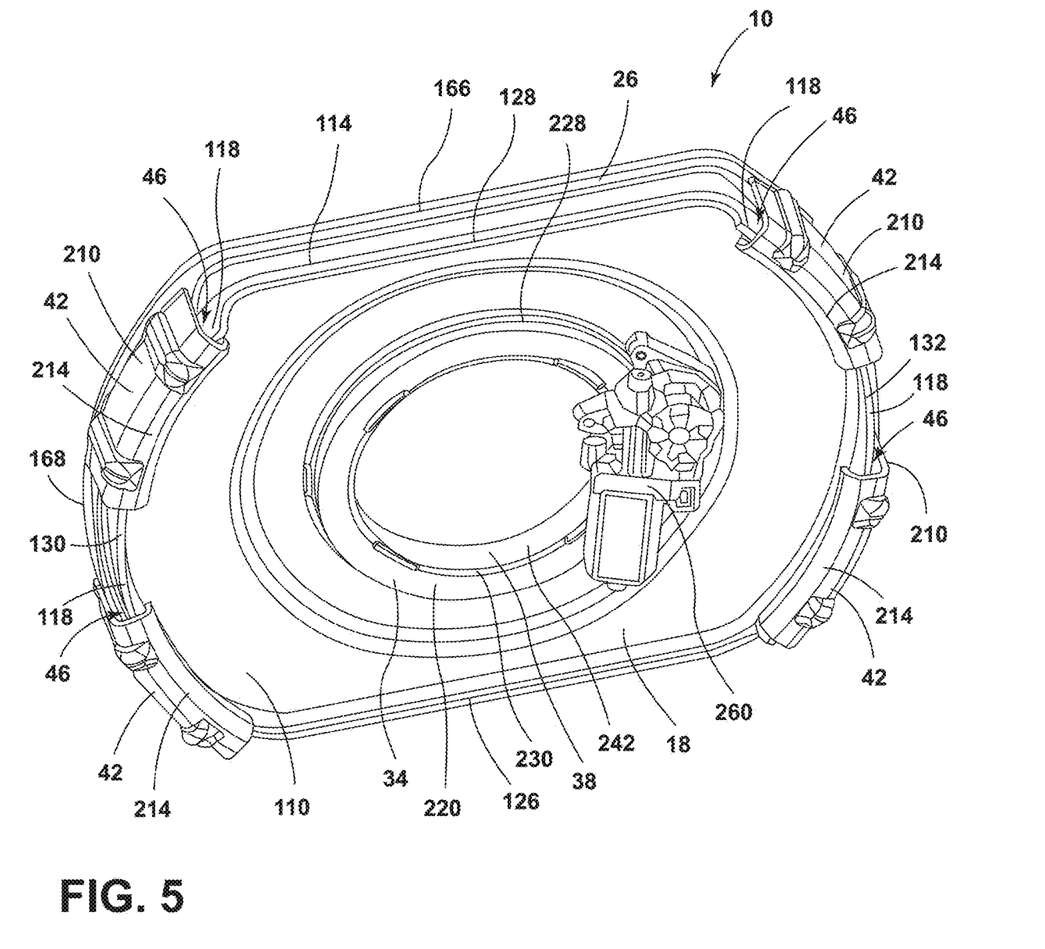
FIG. 5 is a bottom perspective view of the swivel assembly of FIG. 4.
Figure 6:
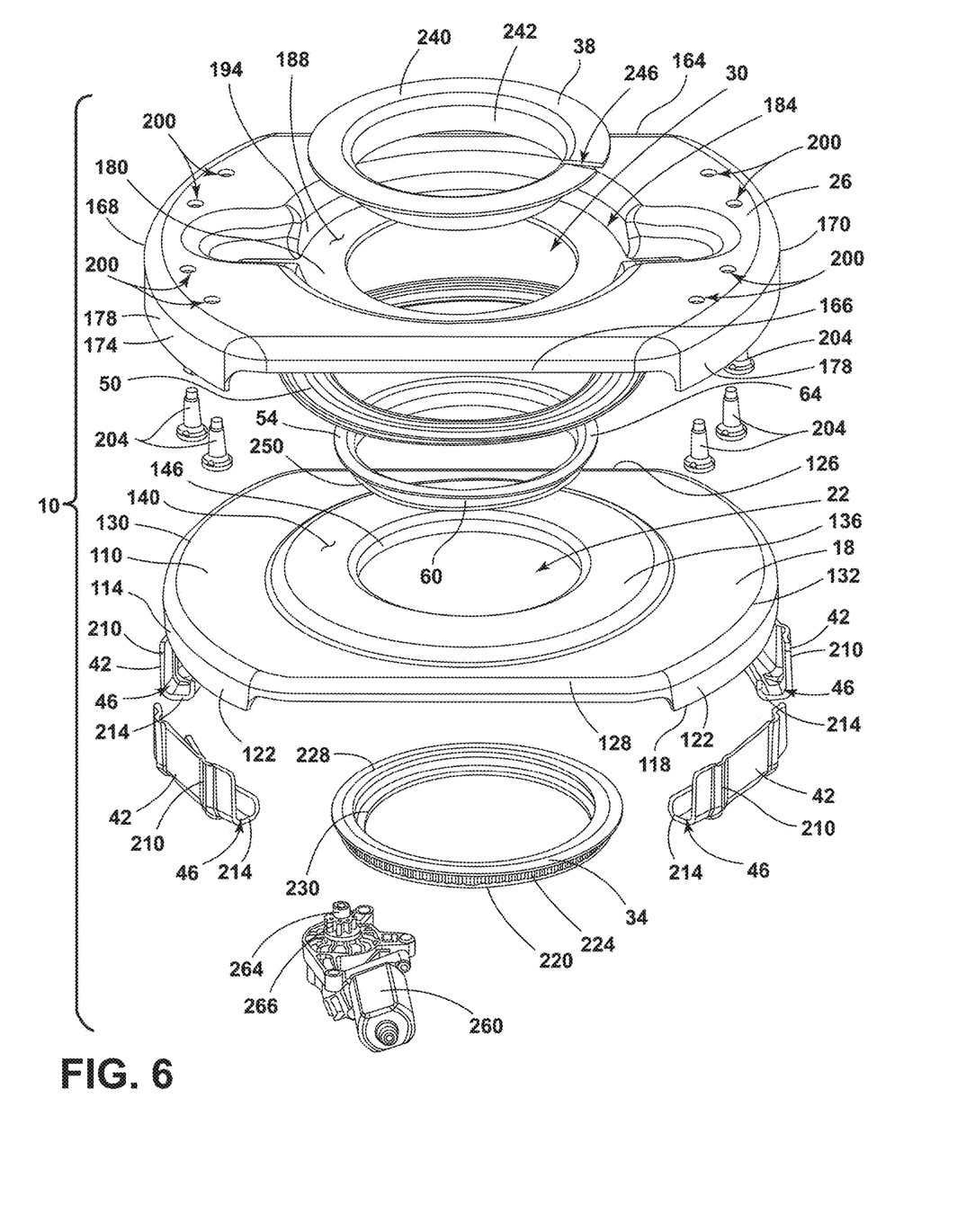
FIG. 6 is an exploded view of the swivel assembly of FIG. 4.

The body 110 of the fixed plate 18 may be surrounded by a first outer rim 114 extending downward from the body 110. The outer rim 114 may include an outer edge 118. According to various examples, the outer rim 114 may have a substantially consistent height across the periphery of the fixed plate 18. In other examples, the outer rim 114 may include extended portions 122 along one or more of the first and second linear sides 126, 128 and/or the first and second arcuate sides 130, 132 of the body 110 of the fixed plate 18. For example, the outer rim 114 may include extended portions 122 along each of the first and second arcuate sides 130, 132 of the body 110 of the fixed plate 18.

A raised central portion 136 may extend upward from the body 110 of the fixed plate 18 in a direction opposite the outer rim 114. The raised central portion 136 may be substantially circular such that the raised central portion 136 defines a ring-shaped upper surface 140. The upper surface 140 may be generally planar and may have a first width. The first opening 22 may be defined by the raised central portion 136 and may be encircled by the ring-shaped upper surface 140 of the raised central portion 136. The first opening 22 may be generally circular and may be aligned along a central axis of the swivel assembly 10. The first opening 22 may be proportional to the raised central portion 136 such that the first width is substantially consistent about the circumference of the upper surface 140. The fixed plate 18 may further include an inner rim 146 extending downward from the raised central portion 136 about the periphery of the first opening 22.

Referring still to FIGS. 4-6, the rotating plate 26 may be positioned vertically aligned with and substantially parallel to the fixed plate 18. Like the fixed plate 18, the rotating plate 26 may include a body 160 having first and second linear sides 164, 166 and first and second arcuate sides 168, 170. The first and second linear sides 164, 166 may be substantially parallel and may be joined by the first and second arcuate sides 168, 170. The first and second linear sides 164, 166 and the first and second arcuate sides 168, 170 may be sized such that the rotating plate 26 is proportionately larger than the fixed plate 18. In other words, the shape and size of the rotating plate 26 may be configured to be complementary to the shape and size of the fixed plate 18.

The body 160 of the rotating plate 26 may be surrounded by a second outer rim 174 extending downward from the body 160. According to various examples, the outer rim 174 may have a substantially consistent height across the periphery of the rotating plate 26. In other examples, the outer rim 174 may include extended portions 178 along one or more sides of the first and second linear sides 164, 166 and first and second arcuate sides 168, 170 of the body 160 of the rotating plate 26. The extended portions 178 of the second outer rim 174 of the rotating plate 26 may be positioned along the same sides of the first and second linear sides 164, 166 and first and second arcuate sides 168, 170 as the extended portion 122 of the first outer rim 114 of the fixed plate 18.

The rotating plate 26 may further include a recessed central portion 180 defining a space 184. The recessed central portion 180 may include an upper surface 188 and a lower surface 190. A sidewall 194 may extend upward from the upper surface 188 to the body 160 of the rotating plate 26. In various examples, the recessed central portion 180 may be generally circular with the sidewall 194 extending circumferentially about the recessed central portion 180. In other examples, the recessed central portion 180 may have extensions framed by the sidewall 194. The second opening 30 may be defined by the recessed central portion 180 and may be aligned along the central axis of the swivel assembly 10. The second opening 30 may be generally circular and may be sized to correlate with the first opening 22 of the fixed plate 18.

The body 160 of the rotating plate 26 may further define a plurality of receiving apertures 200. The plurality of receiving apertures 200 may be positioned proximate the first and second arcuate sides 168, 170 of the rotating plate 26. For example, the plurality of receiving apertures 200 may be positioned in pairs with each pair oriented at a corner of the rotating plate 26 and positioned along one of the first and second arcuate sides 168, 170. Each of the plurality of receiving apertures 200 may be configured to receive a fastener 204. When the fastener 204 is received by the respective receiving aperture 200, the fastener 204 may be sized to extend upward from the body 160 of the rotating plate 26. The fastener 204 may be configured to couple the swivel assembly 10 with the seat base 70 of the vehicle seating assembly 14.

Referring still to FIGS. 4-6, one or more outer retaining brackets 42 may be fixedly coupled with the rotating plate 26. Each of the outer retaining brackets 42 may be a J-shaped bracket having an elongated portion 210 and a retaining portion 214. The retaining portion 214 may define the channel 46 extending the length of the respective outer retaining bracket 42. The elongated portion 210 may be fixedly coupled with the outer rim 174 of the rotating plate 26. For example, the elongated portion 210 may be welded to the outer rim 174 of the rotating plate 26. The outer retaining bracket 42 may be positioned on one of the first and second arcuate sides 168, 170 of the rotating plate 26 proximate an edge of the respective arcuate side 168, 170. Each retaining bracket 42 may be at least partially curved to mirror the curve of the first and second arcuate sides 168, 170. The retaining portion 214 of the outer retaining bracket 42 may be oriented to extend beneath the rotating plate 26 toward the central axis of the swivel assembly 10 such that the channel 46 extends parallel with the respective arcuate side 168, 170 and is spaced apart from the outer rim 174 of the rotating plate 26. It will be understood that the one or more outer retaining brackets 42 may be a single bracket 42 extending about the rotating plate 26, a pair of brackets 42 extending along each of the first and second arcuate sides 168, 170 of the rotating plate 26, or any number of brackets 42 spaced apart along the periphery of the rotating plate 26 without departing from the scope of the present disclosure.

Referring now to FIGS. 5 and 6, the gear ring 34 may be positioned about a periphery of the first opening 22 of the fixed plate 18. The gear ring 34 may include a body 220 defining a plurality of gear teeth 224. The plurality of gear teeth 224 may be positioned circumferentially about the body 220 of the gear ring 34 and may be configured to provide a predetermined rotation. An upper lip 228 may extend circumferentially from and outward of a first end the body 220. A lower lip 230 may extend circumferentially from a second end of the body 220 such that the lower lip 230 is parallel with the upper lip 228. The lower lip 230 may extend toward the central axis of the swivel assembly 10 inward of the body 220 of the gear ring 34.

Referring again to FIGS. 4-6, as discussed above, the rotating plate 26 may be sized to be proportionately larger than the fixed plate 18. More specifically, the rotating plate 26 may be sized to at least partially receive the fixed plate 18 when the swivel assembly 10 is assembled. In other words, the fixed plate 18 may be at least partially encompassed by the rotating plate 26 when the swivel assembly 10 is assembled (see FIGS. 4 and 5). When the fixed plate 18 is received by the rotating plate 26, the second outer rim 174 of the rotating plate 26 is at least partially exterior to the first outer rim 114 of the fixed plate 18. The raised central portion 136 of the fixed plate 18 is aligned with and substantially parallel to the recessed central portion 180 of the rotating plate 26. More specifically, the upper surface 140 of the raised central portion 136 may be aligned with the lower surface 190 of the recessed central portion 180. The first opening 22 is aligned with the second opening 30. The first outer rim 114 and outer edge 118 of the fixed plate 18 are at least partially received by the channel 46 of each of the outer retaining brackets 42.

Referring now to FIGS. 4-7, the inner retaining bracket 38 may be received by the first and second openings 22, 30. The inner retaining bracket 38 may include an upper portion 240 and a lower portion 242. The upper portion 240 may be integrally formed with the lower portion 242 and may extend outward from, and perpendicular to, the lower portion 242. When the inner retaining bracket 38 is received by the first and second openings 22, 30, the lower portion 242 may extend through the first and second openings 22, 30 until the upper portion 240 abuts the upper surface 188 of the recessed central portion 180 of the rotating plate 26.

The lower portion 242 of the inner retaining bracket 38 may be fixedly coupled with the lower lip 230 of the gear ring 34. For example, the lower portion 242 of the inner retaining bracket 38 may be welded to the lower lip 230 of the gear ring 34. Likewise, the upper portion 240 of the inner retaining bracket 38 may be fixedly coupled with the upper surface 188 of the recessed central portion 180 of the rotating plate 26. For example, the upper portion 240 of the inner retaining bracket 38 may be welded to the upper surface 188 of the recessed central portion 180 of the rotating plate 26. In some examples, the inner retaining bracket 38 may define a slot 246. Where the inner retaining bracket 38 defines the slot 246, the slot 246 may extend from the upper portion 240 to the lower portion 242 of the inner retaining bracket 38, and the inner retaining bracket 38 may be at least partially compressible for inserting the inner retaining bracket 38 through the first and second openings 22, 30.

Figure 7:
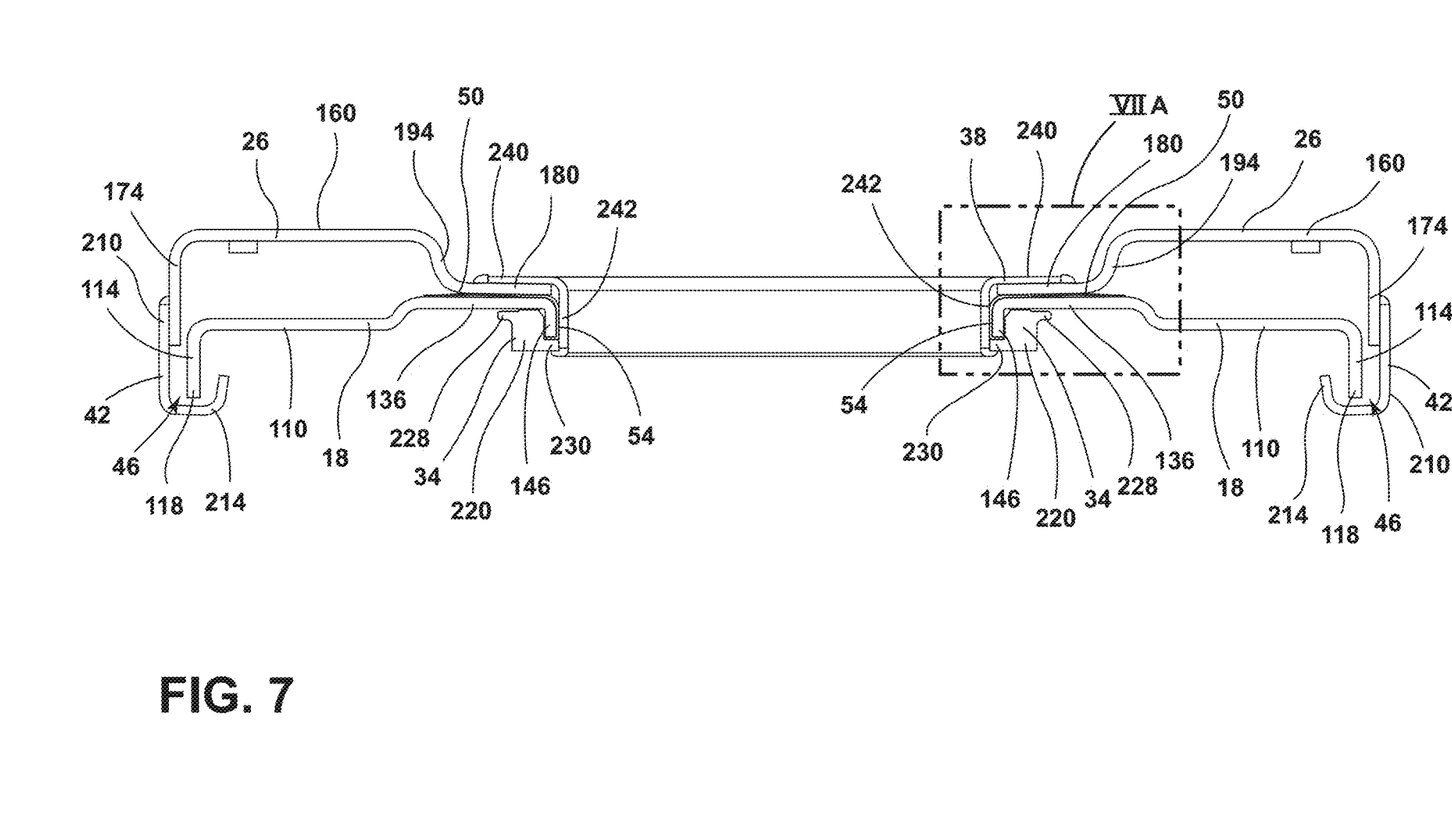
FIG. 7 is a cross-sectional view of the swivel assembly of FIG. 4 taken along line VII-VII.
Figure 7A:
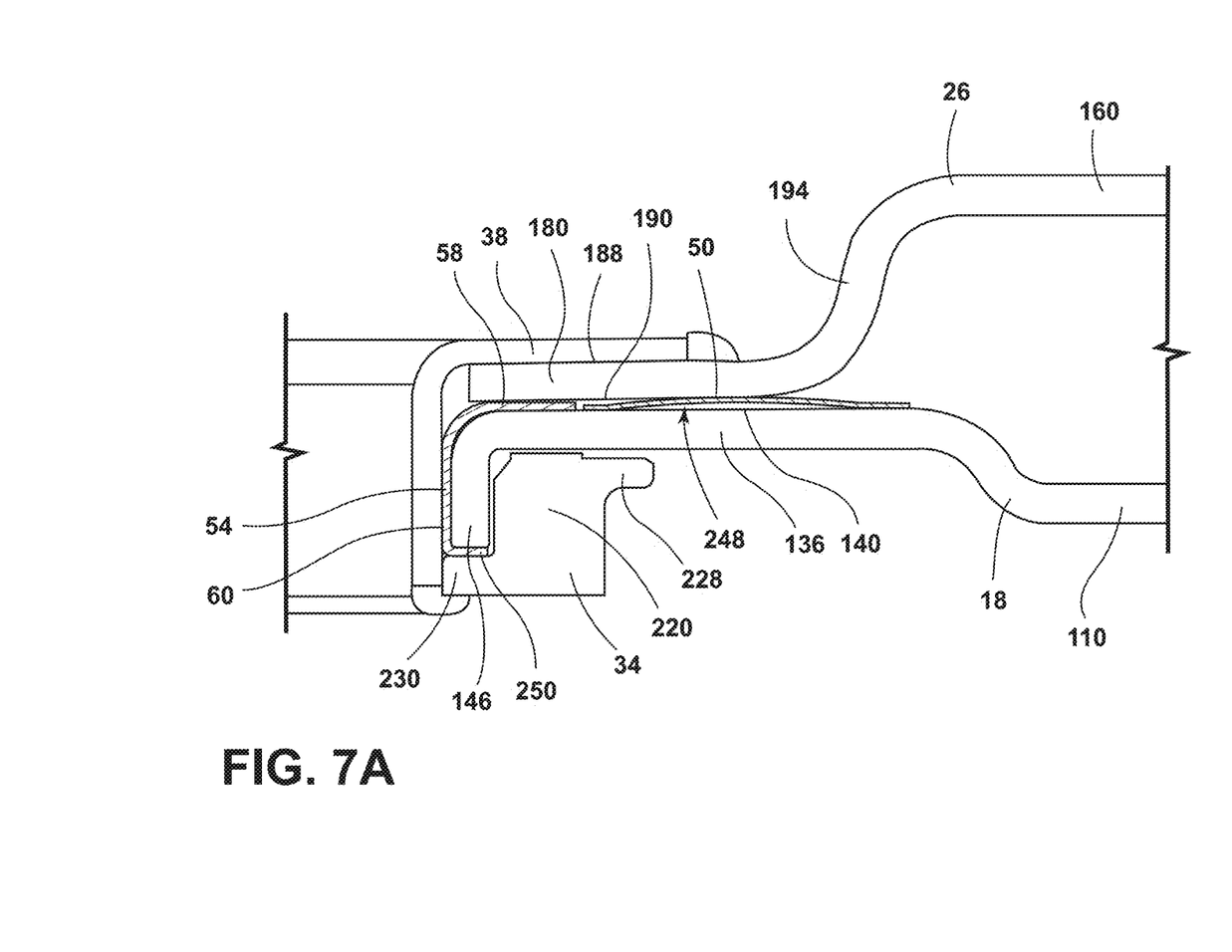
FIG. 7A is an enlarged view of section VIIA of FIG. 7.
Figure 8:
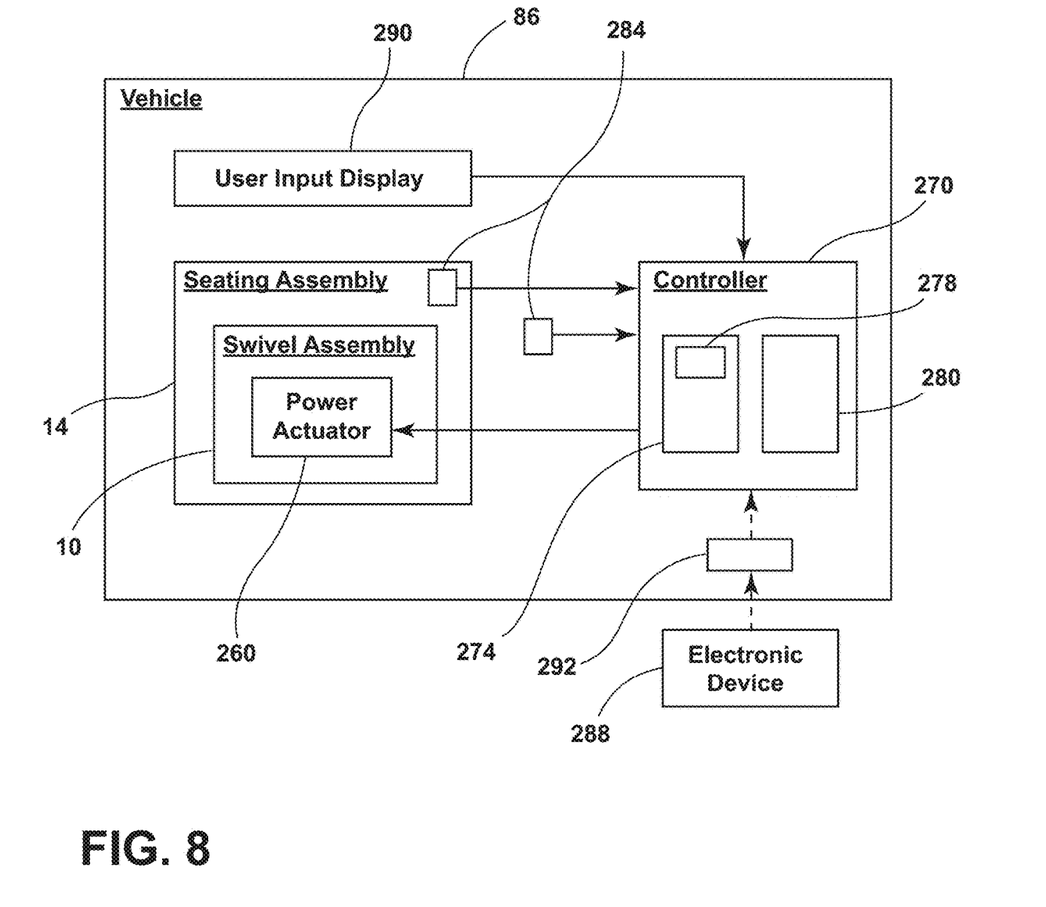
FIG. 8 is a schematic diagram of a vehicle, according to various examples.

Referring now to FIGS. 6-7A, the washer 50 may be positioned between the fixed plate 18 and the rotating plate 26. More specifically, the washer 50 may be positioned between the upper surface 140 of the raised central portion 136 of the fixed plate 18 and the lower surface 190 of the recessed central portion 180 of the rotating plate 26. The washer 50 may have a second width that is substantially the same as or less than the first width of the raised central portion 136 of the fixed plate 18. In various examples, the washer 50 may be a spring washer 50 and may be configured to bias the rotating plate 26 away from the fixed plate 18. More specifically, the spring washer 50 may be configured to space the rotating plate 26 apart from the fixed plate 18 and bias the rotating plate 26 into a neutral position. Where the washer 50 is positioned between the fixed plate 18 and the rotating plate 26, the fixed plate 18 and the rotating plate 26 may define a gap 248.

When the rotating plate 26 is in the neutral position, the outer edge 118 of the outer rim 114 of the fixed plate 18 is spaced apart from the retaining portion 214 of the outer retaining bracket 42. When a load is applied to the swivel assembly 10, the spring washer 50 may be configured to bias the rotating plate 26 back into the neutral position to maintain the spacing for the rotation of the rotating plate 26. For example, the spring washer 50, in combination with the positioning of the fixed plate 18 being fully enclosed by the gear ring 34, inner retaining bracket 38, outer retaining bracket 42, and rotating plate 26, may prevent wobbling and deflection of the rotating plate 26 when the load is applied. The positioning of the fixed plate 18 being fully enclosed by the gear ring 34, inner retaining bracket 38, outer retaining bracket 42, and rotating plate 26 may further provide a smooth rotating movement for an occupant of the seating assembly 14. The inner and outer retaining brackets 38, 42 and gear ring 34 holding the rotating plate 26 in place relative to the fixed plate 18 may further provide solidity for the occupant while the spring washer 50 may prevent deflection upon movement of the occupant in the seating assembly 14 when the occupant is seated in the seating assembly 14 or is moving into or out of occupying the seating assembly 14. It is contemplated that more than one spring washer 50 may be used in conjunction to maintain the neutral position of the rotating plate 26 without departing from the scope of the present disclosure.

The bearing member 54 may be positioned to encompass the inner rim 146 of the fixed plate 18. The bearing member 54 may be at least partially positioned between the rotating plate 26 and the fixed plate 18 and may be configured to form a sliding interface therebetween. The bearing member 54 may include the first leg 58 and the second leg 60. The first leg 58 may be integrally formed with, and be substantially perpendicular to, the second leg 60. A protrusion 250 may extend from an end of the second leg 60 opposite the first leg 58. The protrusion 250 may be substantially perpendicular to the second leg 60 and substantially parallel to the first leg 58. The protrusion 250 may extend in the same direction as the first leg 58 and may be configured to be shorter than the first leg 58.

As shown in FIG. 7A, when the bearing member 54 is positioned within the swivel assembly 10, the first leg 58 may be positioned within the gap 248 defined between the rotating plate 26 and the fixed plate 18. More specifically, the first leg 58 may be positioned between the lower surface 190 of the recessed central portion 180 of the rotating plate 26 and the upper surface 140 of the raised central portion 136 of the fixed plate 18. The second leg 60 may be positioned between the fixed plate 18 and the inner retaining bracket 38. More specifically, the second leg 60 may be positioned between the inner rim 146 of the fixed plate 18 and the lower portion 242 of the inner retaining bracket 38. The protrusion 250 may be positioned between the inner rim 146 of the fixed plate 18 and the lower lip 230 of the gear ring 34. The protrusion 250 may be configured to form a sliding interface between the gear ring 34 and the fixed plate 18 to facilitate rotation of the gear ring 34 relative to the fixed plate 18.

Referring now to FIGS. 3-7A, a power actuator 260 may be coupled with the fixed plate 18. The power actuator 260 may be configured as a motor and may include a pinion 264. The pinion 264 may be operably coupled with the gear ring 34 such that rotation of the pinion 264 drives the rotation of the gear ring 34. The pinion 264 may include a plurality of pinion teeth 266 sized to engage with the plurality of gear teeth 224 of the gear ring 34. The rotation of the pinion 264 and the plurality of pinion teeth 266 may be configured to drive the rotation of the gear ring 34 at a predetermined speed of rotation. It will be understood that the gear ring 34 and the plurality of gear teeth 224 may be sized to facilitate the predetermined speed of rotation for the seating assembly 14. As the gear ring 34 rotates, the inner retaining bracket 38 may be configured to simultaneously rotate in conjunction with the gear ring 34. Likewise, the rotating plate 26 may be configured to simultaneously rotate in conjunction with the inner retaining bracket 38 and the gear ring 34. Rotation of the rotating plate 26 relative to the fixed plate 18 may be facilitated by the first and second arcuate sides 130, 132 of the fixed plate 18 and the first and second arcuate sides 168, 170 of the rotating plate 26. The outer retaining brackets 42 may further rotate in conjunction with the rotating plate 26 about the first and second arcuate sides 130, 132 of the fixed plate 18. Thus, the rotation of the pinion 264 and the plurality of pinion teeth 266 may be configured to drive the rotation of the rotating plate 26 relative to the fixed plate 18.

Referring again to FIGS. 1-8, a controller 270 may be electrically coupled with the power actuator 260. The controller 270 may include a memory 274 having instructions 278 stored thereon that are executable by a processor 280. The instructions 278 may generally relate to the speed and duration of the rotation of the pinion 264 to provide a selected rotation of the vehicle seating assembly 14 using the swivel assembly 10. The controller 270 may be configured to receive user input for selecting the instructions 278 provided to the power actuator 260. User input may be received from a switch 284 positioned proximate the vehicle seating assembly 14 (FIG. 1), an electronic device 288, or a user input display 290 of the vehicle 86 (FIG. 1). The electronic device 288 may be, for example, a mobile phone, a tablet, a computer, a smart watch, or any other electronic device capable of receiving user input. The electronic device 288 may be configured to communicate with one of a plurality of wireless communication circuits 292 of the vehicle 86 via a wireless protocol (e.g., Bluetooth®, WiFi, etc.) to provide input to the controller 270. Alternatively, the electronic device 288 may be configured to communicate with the controller 270 via a wired connection (e.g., a USB connection).

It will be understood by one having ordinary skill in the art that construction of the described disclosure and other components is not limited to any specific material. Other exemplary embodiments of the disclosure disclosed herein may be formed from a wide variety of materials, unless described otherwise herein.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A swivel assembly for a vehicle seating assembly comprising:
   a fixed plate defining a first opening;
   a rotating plate defining a second opening, wherein the rotating plate is positioned substantially parallel to the fixed plate;
   a gear ring positioned about a periphery of the first opening;
   an inner retaining bracket received by the first and second openings, the inner retaining bracket coupled with the gear ring;
   an outer retaining bracket coupled with the rotating plate and defining a channel, wherein the fixed plate is at least partially received by the channel;
   a washer positioned between the fixed plate and the rotating plate; and
   a bearing member including first and second legs, wherein the first leg is positioned between the rotating plate and the fixed plate, and further wherein the second leg is positioned between the fixed plate and the inner retaining bracket.

2. The swivel assembly of claim 1, further comprising:
   a power actuator coupled with the fixed plate and including a pinion, wherein the pinion is operably coupled with the gear ring, and further wherein rotating of the pinion is configured to drive rotation of the gear ring.

3. The swivel assembly of claim 1, wherein the fixed plate includes a first outer rim and the rotating plate includes a second outer rim, and further wherein the second outer rim is at least partially exterior to the first outer rim.

4. The swivel assembly of claim 3, wherein the first outer rim is at least partially received by the channel of the outer retaining bracket.

5. The swivel assembly of claim 1, wherein each of the fixed plate and the rotating plate includes at least one linear side and at least one arcuate side.

6. The swivel assembly of claim 1, wherein the fixed plate is at least partially encompassed by the rotating plate.

7. A swivel assembly for a vehicle seating assembly comprising:
   a fixed plate including a raised central portion defining a first opening;
   a rotating plate including a recessed central portion defining a second opening, wherein the raised central portion and the recessed central portion are positioned substantially parallel;
   a gear ring positioned about a periphery of the first opening;
   an inner retaining bracket received by the first opening and the second opening, the inner retaining bracket coupled with the gear ring;
   a washer positioned between the raised central portion and the recessed central portion, wherein the washer is a spring washer and is configured to space apart the fixed plate and the rotating plate to define a gap; and
   a bearing member at least partially positioned between the rotating plate and the fixed plate and forming a sliding interface therebetween.

8. The swivel assembly of claim 7, further comprising:
   an outer retaining bracket coupled with the rotating plate, wherein the outer retaining bracket includes an elongated portion and a retaining portion, the retaining portion defining a channel, and further wherein an outer edge of the fixed plate is at least partially received by the channel.

9. The swivel assembly of claim 7, wherein the bearing member includes a first leg positioned between the raised central portion and the recessed central portion and forming a sliding interface therebetween, and a second leg positioned between a lower portion of the inner retaining bracket and the fixed plate and forming a sliding interface therebetween.

10. The swivel assembly of claim 9, wherein the bearing member further includes a protrusion extending from an end of the second leg opposite the first leg, wherein the protrusion is positioned between the gear ring and the inner edge of the fixed plate and forms a sliding interface therebetween.

11. The swivel assembly of claim 7, wherein the inner retaining bracket is coupled with an upper surface of the recessed central portion of the rotating plate.

12. A swivel assembly for a vehicle seating assembly comprising:
   a fixed plate defining a first opening;
   a rotating plate rotatable relative to the fixed plate and defining a second opening, wherein the first opening is aligned with the second opening;
   a gear ring positioned about a periphery of the first opening;
   an inner retaining bracket received by the first opening and the second opening, the inner retaining bracket coupled with the gear ring; and
   a bearing member at least partially positioned between the rotating plate and the fixed plate, wherein a gap is defined between the fixed plate and the rotating plate, and further wherein a spring washer is disposed in the gap and configured to maintain the gap between the fixed Mate and the rotating plate and to bias the rotating plate and the fixed late to a neutral position.

13. The swivel assembly of claim 12, further comprising:
   an outer retaining bracket including an elongated portion and a retaining portion, the elongated portion fixedly coupled with the rotating plate, wherein the outer retaining bracket rotates in conjunction with the rotating plate.

14. The swivel assembly of claim 13, wherein an outer edge of the fixed plate is spaced apart from the outer retaining bracket when the rotating plate and the fixed plate are in a neutral position.

15. The swivel assembly of claim 12, wherein the inner retaining bracket includes an upper portion integrally formed with a lower portion, and further wherein the upper portion is coupled with the rotating plate and the lower portion is coupled with the gear ring, and further wherein the inner retaining bracket and the rotating plate are configured to rotate in conjunction with the gear ring.

16. The swivel assembly of claim 12, further comprising:
a power actuator coupled with the fixed plate and including a pinion, wherein the pinion is operably coupled with the gear ring, and further wherein rotation of the pinion is configured to drive rotation of the gear ring.

17. The swivel assembly of claim 16, further comprising:
a controller electrically coupled with the power actuator, wherein the controller is configured to provide instructions to the power actuator for rotation of the pinion.

18. The swivel assembly of claim 12, wherein the bearing member includes a first leg positioned between the fixed plate and the rotating plate and forming a sliding interface therebetween, a second leg positioned between a lower portion of the inner retaining bracket and the fixed plate and forming a sliding interface therebetween, and a protrusion extending from an end of the second leg opposite the first leg, wherein the protrusion is positioned between the gear ring and an inner rim of the fixed plate and forming a sliding interface therebetween.

\* \* \* \* \*

UNITED STATES PATENT AND TRADEMARK OFFICE
CERTIFICATE OF CORRECTION

PATENT NO. : 10,988,053 B2  
APPLICATION NO. : 16/406396  
DATED : April 27, 2021  
INVENTOR(S) : Kish et al.

Page 1 of 1

It is certified that error appears in the above-identified patent and that said Letters Patent is hereby corrected as shown below:

In the Claims

Column 12:  
Claim 12, Line 51; "Mate" should read --plate--.  
Claim 12, Line 52; "fixed late" should read --fixed plate--.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*